United States Patent
Nishida et al.

(10) Patent No.: US 7,518,825 B2
(45) Date of Patent: Apr. 14, 2009

(54) THIN FILM MAGNETIC HEAD WHEREIN AT LEAST ONE OF A RETURN POLE, A FIRST SHIELD, AND A SECOND SHIELD HAS A REVERSE TAPER

(75) Inventors: Syuji Nishida, Kanagawa (JP); Yasutaka Nishida, Tokyo (JP); Ikuya Tagawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 410 days.

(21) Appl. No.: 11/317,192

(22) Filed: Dec. 22, 2005

(65) Prior Publication Data
US 2006/0139815 A1 Jun. 29, 2006

(30) Foreign Application Priority Data
Dec. 28, 2004 (JP) ............................. 2004-380964

(51) Int. Cl.
G11B 5/10 (2006.01)
G11B 5/187 (2006.01)
(52) U.S. Cl. ...................... 360/125.2; 360/125.21; 360/319
(58) Field of Classification Search .............. 360/125.2, 360/125.21, 319
See application file for complete search history.

(56) References Cited

U.S. PATENT DOCUMENTS

| | | | | |
|---|---|---|---|---|
| 5,726,841 A * | 3/1998 | Tong et al. | .................. | 360/122 |
| 5,920,449 A * | 7/1999 | Tagawa | ...................... | 360/122 |
| 7,093,348 B2 * | 8/2006 | Sasaki | ...................... | 29/603.13 |
| 7,239,480 B2 * | 7/2007 | Hirabayashi et al. | ... | 360/125.37 |
| 7,296,337 B2 * | 11/2007 | McFadyen | ............... | 29/603.16 |
| 2004/0240108 A1 * | 12/2004 | Shukh | ........................ | 360/125 |
| 2006/0067006 A1 * | 3/2006 | Takagishi et al. | ........... | 360/319 |
| 2006/0103980 A1 * | 5/2006 | Sasaki et al. | ................ | 360/126 |
| 2006/0126223 A1 * | 6/2006 | Kameda | ...................... | 360/126 |
| 2006/0245113 A1 * | 11/2006 | Guan et al. | ................. | 360/319 |
| 2008/0019043 A1 * | 1/2008 | Toma et al. | ................. | 360/110 |

FOREIGN PATENT DOCUMENTS

JP 2004-185672 7/2004

* cited by examiner

Primary Examiner—Jefferson Evans
(74) Attorney, Agent, or Firm—Townsend and Townsend and Crew LLP; Rambod Nader

(57) ABSTRACT

Embodiments of the invention avoid loss of information as recorded, due to an external magnetic field applied. In one embodiment, a pole expanded part prone to occurrence of magnetic saturation is formed so as to prevent magnetic fluxes from being converged at ends of a return pole of a magnetic head.

17 Claims, 14 Drawing Sheets

THIN FILM MAGNETIC HEAD WHEREIN AT LEAST ONE OF A RETURN POLE, A FIRST SHIELD, AND A SECOND SHIELD HAS A REVERSE TAPER

CROSS-REFERENCES TO RELATED APPLICATIONS

This application claims priority from Japanese Patent Application No. JP2004-380964, filed Dec. 28, 2004, the entire disclosure of which is incorporated herein by reference.

BACKGROUND OF THE INVENTION

The present invention relates to a magnetic recording system using a double-layered perpendicular magnetic recording medium, and a magnetic head mounted in the magnetic recording system.

In order to promote higher recording density of a hard-disk drive, it is considered advantageous to adopt a double-layered perpendicular magnetic recording method using a double-layered perpendicular magnetic recording medium having a soft magnetic underlying layer, as a magnetic recording medium, and using a single-pole type write head (hereinafter referred to as an SPT head) having a main pole and return pole, as a magnetic write head.

It has since been validated that with a magnetic recording system, an external magnetic field inadvertently applied from outside a housing thereof, and presence of a floating magnetic field present inside the magnetic recording system result in degradation of magnetized information as recorded, thereby causing a serious problem in applications thereof. In particular, in the case of the double-layered perpendicular magnetic recording system, the use of a double-layered medium acts such that the soft magnetic underlying layer thereof pulls in the external magnetic field, and a magnetic field produced by convergence of magnetic fluxes, due to interaction between the double-layered medium and a magnetic head, causes erasure of magnetization already recorded, so that there is a good possibility of information being lost, thereby creating a cause for deterioration in reliability of the magnetic recording system. There exists documentation concerning problems that recorded information is lost by the agency of the external magnetic field; however, no documentation is concerned with the case where a magnetic field in a direction perpendicular to a medium plane is applied, centering on the erasure of recorded magnetization, by the agency of the main pole of the SPT head. A known system is shown in JP-A No. 185672/2004.

BRIEF SUMMARY OF THE INVENTION

Erasure of the recorded information also occurs at respective ends of the return pole of the SPT head as well as a read MR head shield by the agency of the external magnetic field. This type of erasure of the recorded information is most prone to occur when the external magnetic field is applied in a cross-track direction (a direction parallel with the medium plane, and normal to a traveling direction of the head). This is a phenomenon obviously different from the case of the erasure of the information by the agency of the main pole of the SPT head, occurring upon application of an external magnetic field in the direction perpendicular to the medium plane, and is different from an erasure problem of recorded information, as assumed by the conventional technology. The information erasure by the agency of the main pole occurs because magnetic fluxes passing from the head to the soft magnetic underlying layer are concentrated in the main pole; however, the information erasure occurring at the respective ends of the return pole as well as the read head shield is induced by magnetic fluxes converged between the soft magnetic underlying layer, and the respective ends of the return pole as well as the read head shield. Such convergence of the magnetic fluxes occurs because the magnetic fluxes existing to the extent of magnetic saturation in the soft magnetic underlying layer by the agency of an external magnetic field parallel with the medium plane tend to choose a path smaller in magnetic resistance, passing through an unsaturated pole material large in permeability.

It is therefore a feature of the invention to provide a magnetic head capable of avoiding loss of information, occurring at respective ends of a return pole of a write head as well as a read MR head shield when an external magnetic field is applied.

To that end, a magnetic head according to the invention has adopted a tapered shape (hereinafter referred to as a pole tapered shape) for the return pole, the read shields, and so forth, at respective ends thereof, in which a cross-sectional area of each of the faces thereof, normal to the cross-track direction, decreases from the center of the head toward outside in the cross-track direction, and a cross-sectional area of each of the faces thereof, normal to the direction of an element height, decreases upward from an air bearing surface in the direction of the element height.

When a magnetic material has the tapered shape in a traveling direction of magnetic fluxes, the magnetic fluxes undergo convergence along the taper. At that time, infinite convergence of the magnetic fluxes does not occur, but is limited by saturation magnetic flux density Bs of the magnetic material, and when a part of the magnetic material reaches magnetic saturation, no more convergence of the magnetic fluxes occurs to the part thereof. Accordingly, if a magnetic saturation region is intentionally formed by providing the pole tapered shape, and an erase field occurring when the saturation occurs is not more than a tolerance for the erase field, that is, an erase field having coercivity equivalent to about half of a medium coercivity, it is possible to avoid occurrence of information erasure, and furthermore, even if an external magnetic field is further strengthened, the erase field is not rendered stronger, so that the occurrence of information erasure can be avoided.

According to the present invention, information erase in a double-layered perpendicular recording system, occurring by the agency of an external magnetic field, can be avoided only by a simple change in the shape of a head, so that a magnetic recording system inexpensive and high in reliability can be provided.

DETAILED DESCRIPTION OF THE INVENTION

Embodiments of the invention are described hereinafter with reference to the accompanying drawings.

Figure 1:
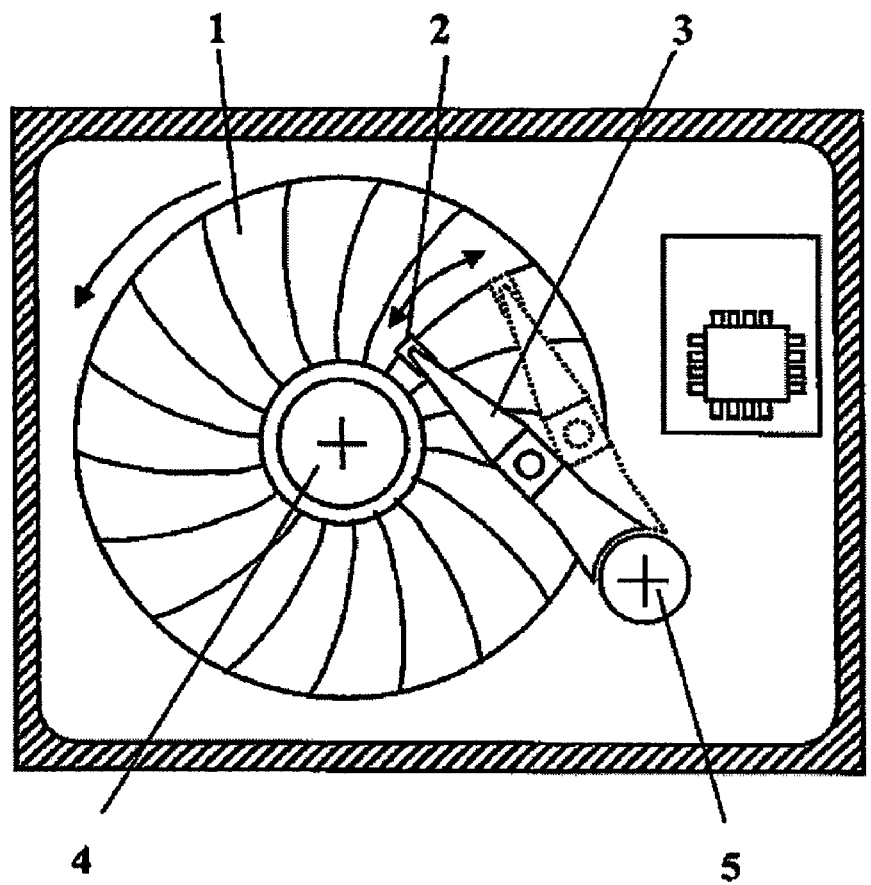
FIG. 1 is a schematic view broadly showing a construction of a hard-disk drive by way of example.
Figure 2:
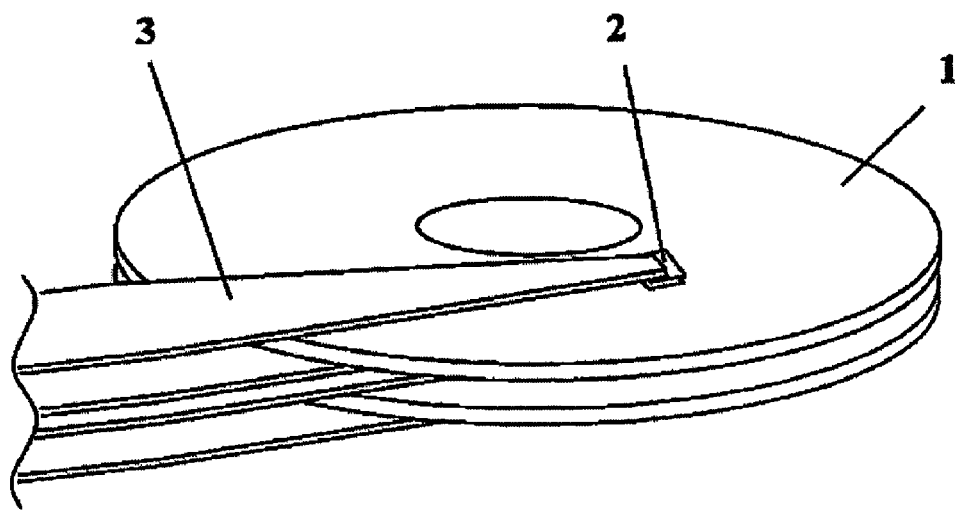
FIG. 2 is a schematic view broadly showing a construction of a medium and a head of the hard-disk drive by way of example.
Figure 3:
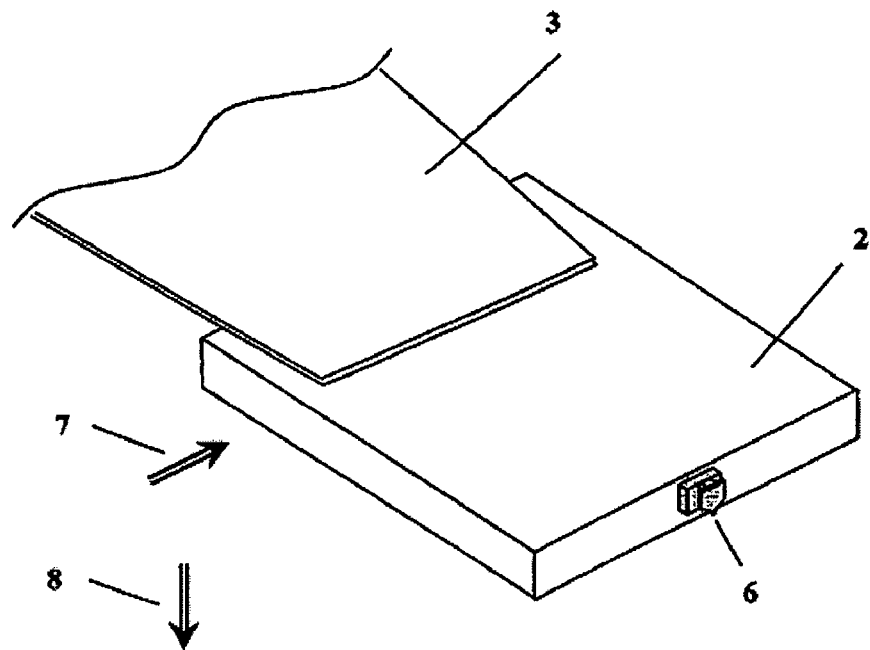
FIG. 3 is an enlarged block diagram showing a construction of a slider and a suspension of the hard-disk drive by way of example.

FIGS. 1 to 3 are schematic illustrations showing a magnetic recording system with the invention applied thereto. FIG. 1 is a schematic view broadly showing the construction of a double-layered perpendicular magnetic recording system. When the magnetic recording system is in operation, a perpendicular magnetic head 6 mounted on a head slider 2 floats over a perpendicular double-layered medium 1 rotating around a rotating shaft of a spindle motor 4, and moves in the radial direction of the medium while centering around a support of a rotary actuator 5. FIGS. 2 and 3 are enlarged schematic illustrations of a perpendicular double-layered medium 1, and a suspension 3 supporting and the head slider 2. The head slider 2 supported by the suspension 3 floats and moves over the perpendicular double-layered medium 1 that rotates, and the head element 6 mounted on the head slider 2 writes and reads.

Principal components of an external magnetic field, causing generation of an erase field, are a perpendicular external magnetic field 8 in a direction perpendicular to the medium 1, in the vicinity of the head element 6, and, a magnetic field 7 in a cross-track direction horizontal in relation to the medium 1, in the vicinity of the head element 6. Those are magnetic field components in the vicinity of the head element 6 and the slider 2, not necessarily in agreement with the direction of an external magnetic field applied to a housing. That is because the direction of the external magnetic field undergoes changes inside the housing by the agency of the spindle motor 4, and the rotary actuator 5, having magnetic material, installed inside the housing, so that uniform magnetic field distribution does not result. The direction of the external magnetic field, described in the present specification, refers to the direction of the magnetic field applied to the head 6.

A construction of the head according to one embodiment of the invention, and the effect thereof are described hereinafter with reference to FIGS. 4 to 8.

Figure 4:
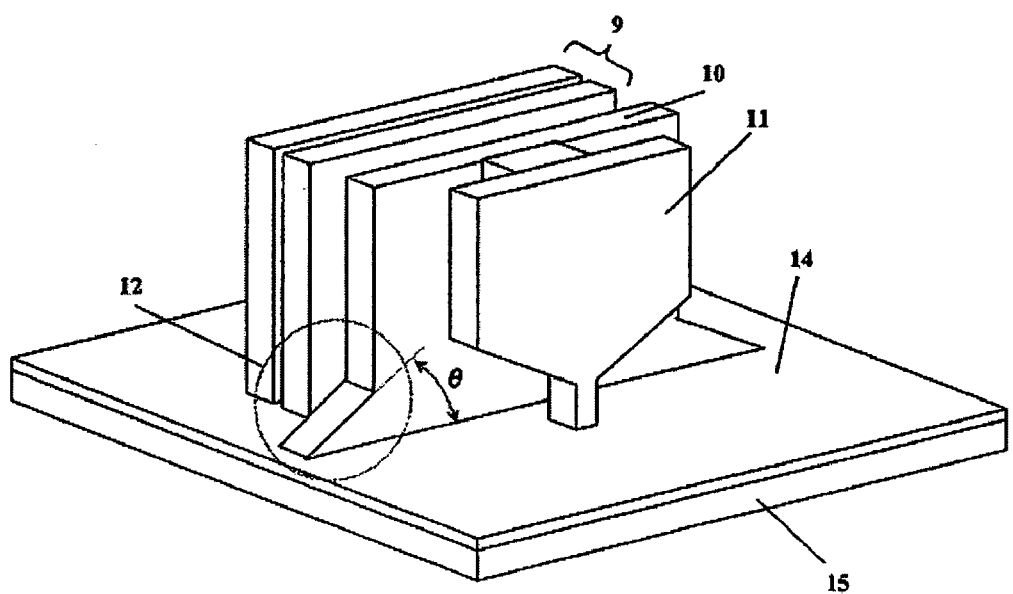
FIG. 4 is an enlarged block diagram showing a construction of an SPT head according to one embodiment of the invention.

FIG. 4 is an enlarged schematic illustration of the perpendicular double-layered medium 1, and the SPT head 6 according to the embodiment of the invention. The perpendicular double-layered medium 1 is provided with a soft magnetic underlying layer 15, and a magnetic recording layer 14. The SPT head 6 is provided with a main pole 11 for forming record magnetization in the magnetic recording layer 14, and a return pole 10 to which magnetic fluxes from the main pole 11 return after passing through the soft magnetic underlying layer 15 of the medium. Further, there is disposed a read MR head for utilizing magneto-resistance effect, together with a write head, and the read MR head is in a shape with a magneto-resistive element sandwiched between two soft magnetic shields 9. Now, the return pole 10 has a pole-tapered structure in which a pole expanded part 12 is added to both ends of the return pole 10, in the cross-track direction, on the side of an air bearing surface, and the end of each of the pole expanded parts 12 forms an acute angle with the air bearing surface. As a shape parameter for defining pole taper, use is made of an angle θ formed between a pole upper surface, at the end of the pole expanded part 12, and the air bearing surface. The smaller the angle θ, the more easily saturation tends to occur to the pole expanded parts 12.

Figure 13:
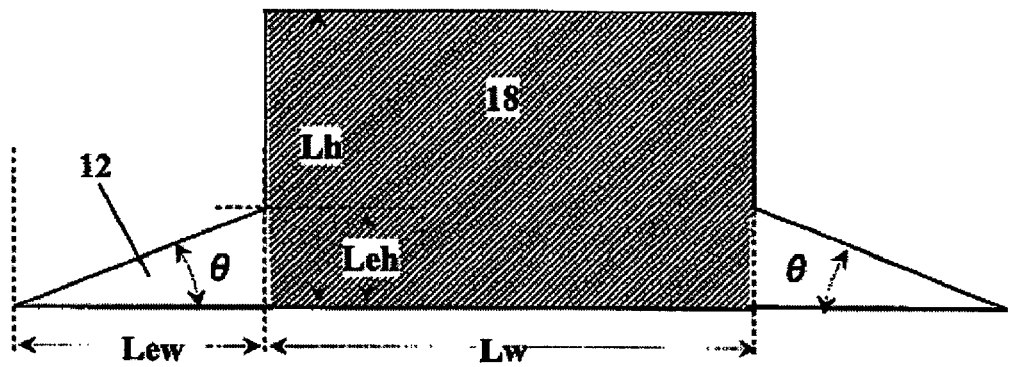
FIG. 13 is a block diagram showing a construction of a return pole according to the invention by way of example.

In order to verify the effect of the invention, numerical analysis was performed on the return pole in the tapered shape, provided with the pole expanded parts 12 each in a wedge-like shape, 30 μm in width Lew, 8 μm in height Leh, and 2 μm in thickness, added to a return pole in the conventional shape of a rectangular flat sheet, 60 μm in width Lw, 30 μm in height Lh, and 2 μm in thickness, so as to render an angle θ equal to 15 degrees, as shown in FIG. 13. Further, for the sake of comparative reference, numerical analysis also was made on the return pole in the conventional shape of the rectangular flat sheet, 60 μm in width Lw, 30 μm in height Lh, and 2 μm in thickness. Assuming use of a soft magnetic material $Ni_{80}Fe_{20}$ generally in widespread use as a head material, the magnetic pole was assumed to have magnetic property of saturation magnetic flux density Bs=1T, and initial permeability $\mu_0$=1000.

In considering a principal perpendicular recording medium of today, as for quantitative tolerance for an erase field, in the case of a medium having coercivity of about 400 kA/m (5000 Oe), the medium having a tolerance for an erase field up to about 200 kA/m (2500 Oe), equivalent to about half of the medium coercivity, is regarded tolerable, and a head, medium, and system are designed so as to meet such a requirement. In this case, an erase field produced by two kinds of external magnetic field components, one in the direction perpendicular to the medium, and the other in the cross-track direction, was found by numerical analysis, and the effect of the invention was verified by use of 200 kA/m, which is a tolerable strength, as a guide.

Figure 5:
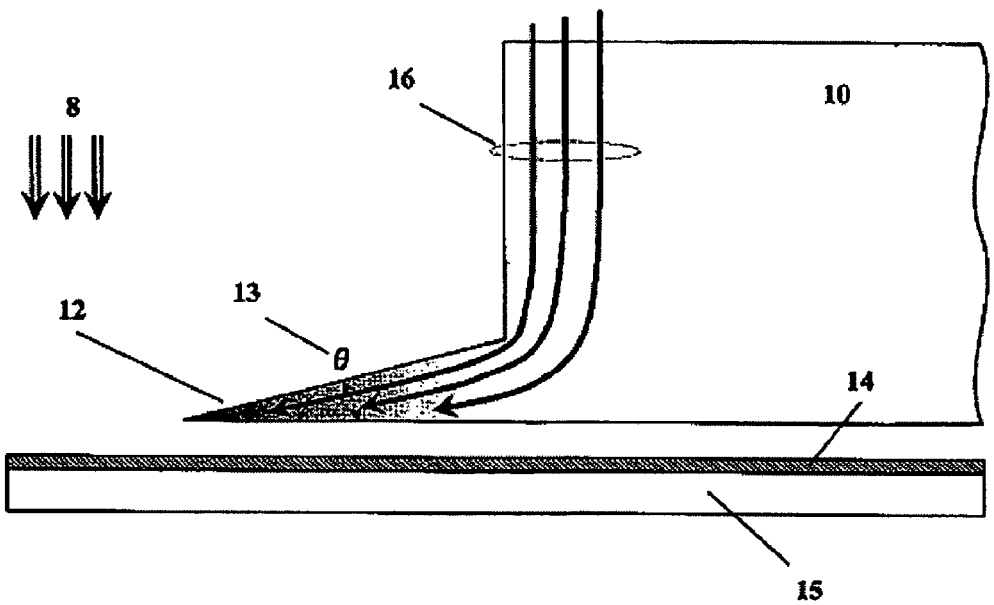
FIG. 5 is a block diagram showing the behavior of magnetic fluxes occurring due to an external magnetic field in the direction perpendicular to the medium.

FIG. 5 is a plan view of the return pole 10 according to the embodiment of the invention, as seen from the traveling direction of the head, and is a view showing the behavior of magnetic fluxes 16 when the external magnetic field in the direction perpendicular to the medium is applied. Magnetic saturation occurs at the end of the pole expanded part 12 due to the pole taper, so that no further convergence of the magnetic fluxes occurs to the pole expanded part 12 and the magnetic fluxes are dispersed.

Figure 6:
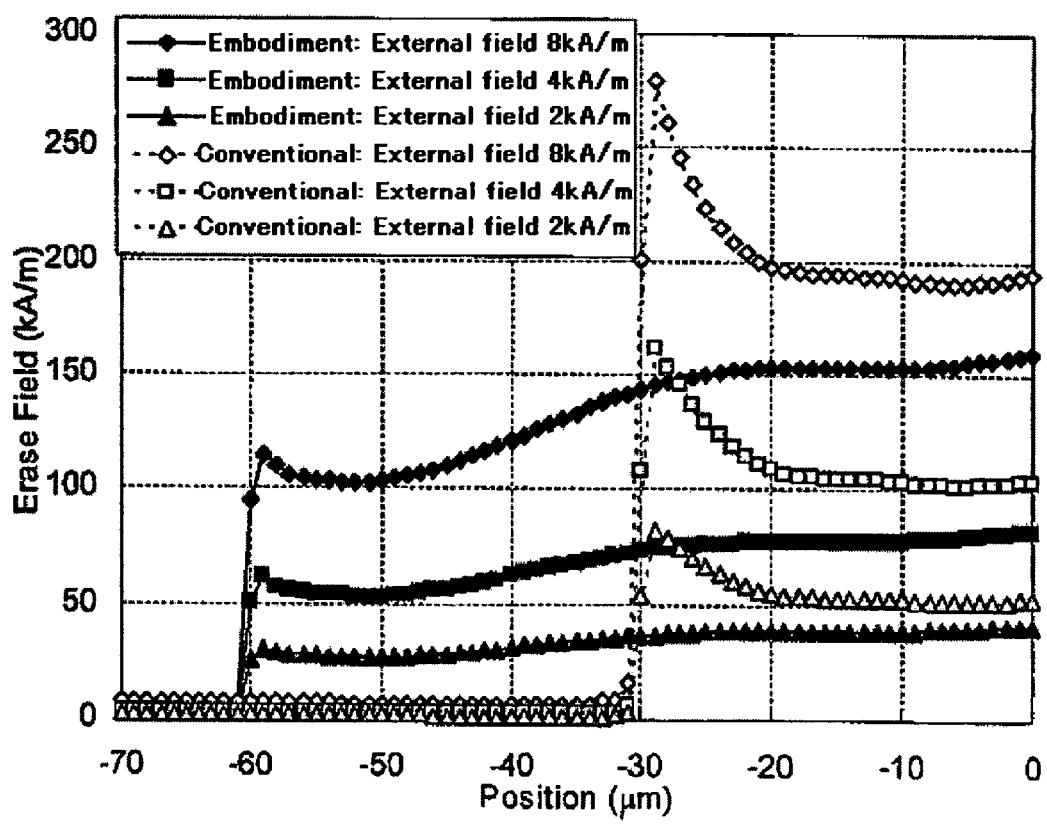
FIG. 6 is a view showing distributions of erase fields occurring due to the external magnetic field in the direction perpendicular to the medium.

In FIG. 6, distributions of erase fields occurring to the recording layer 14 when the external magnetic fields at 2 kA/m (25 Oe), 4 kA/m (50 Oe), and 8 kA/m (100 Oe) are applied in the perpendicular direction, respectively, found by numerical analysis, are shown by solid lines. The center position of the return pole, in the widthwise direction thereof, is designated as 0 along the horizontal axis. For the purpose of comparison, distributions of erase fields in the case of a return pole in the conventional shape without the pole expanded parts 12 are shown by dotted lines. In contrast to the convention shape wherein erase field strength is found exceeding 200 kA/m with the external magnetic field at 8 kA/m (open rhombus), with the present embodiment of the invention, wherein erase field strength is found at around 150 kA/m with the external magnetic field at 8 kA/m (solid rhombus), leaving some leeway for 200 kA/m as the upper limit of tolerance. Thus, an improvement effect of the shape of the return pole according to the invention on an erase field against the external magnetic field perpendicular to a medium plane was validated.

Figure 7:
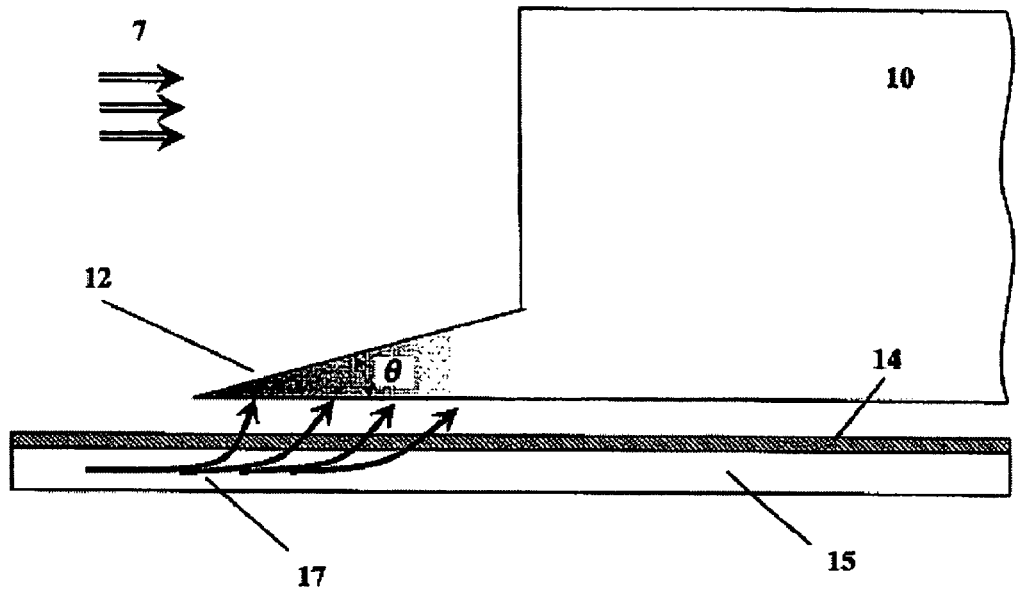
FIG. 7 is a block diagram showing the behavior of magnetic fluxes occurring due to an external magnetic field in the cross-track direction.

FIG. 7 is a plan view of the return pole 10 according to the embodiment of the invention, as seen from the traveling direction of the head, similar to FIG. 5, and is a view showing the behavior of magnetic fluxes 17 when the external magnetic field in the cross-track direction is applied. Magnetic saturation occurs at the pole expanded parts 12, so that no further convergence of the magnetic fluxes occurs to the pole expanded parts 12, and the magnetic fluxes are dispersed.

Figure 8:
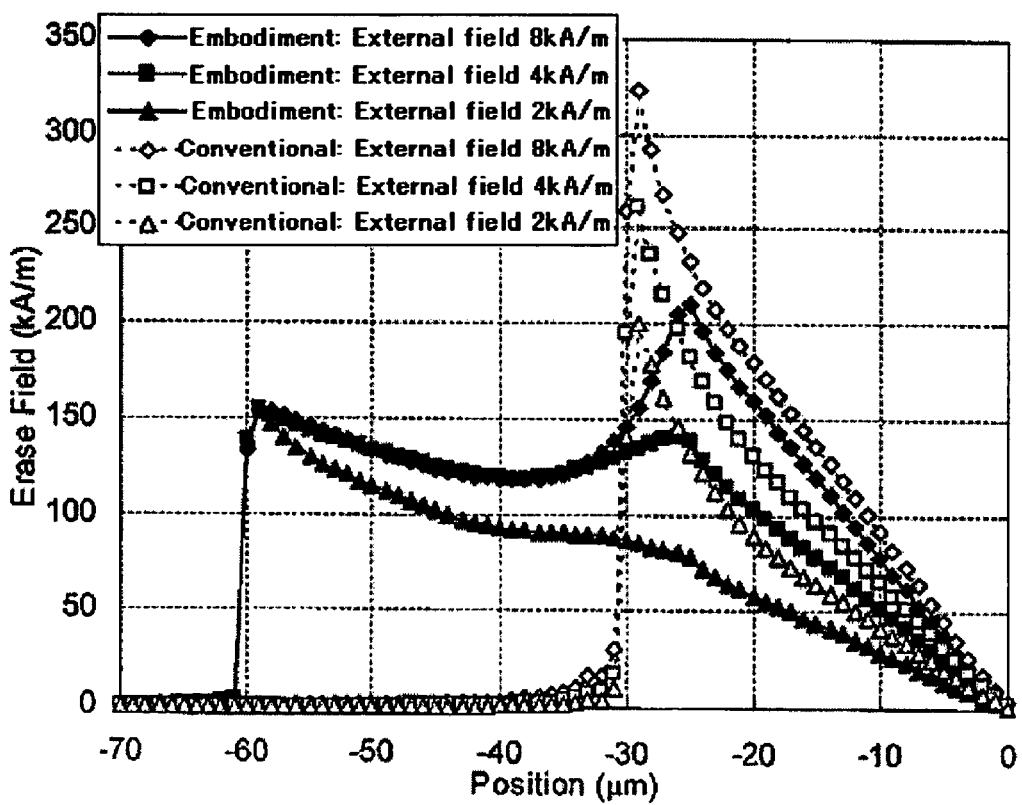
FIG. 8 is a view showing distributions of erase fields occurring due to the external magnetic field in the cross-track direction.

In FIG. 8, distributions of erase fields occurring to the recording layer 14 when the external magnetic fields at 2 kA/m, 4 kA/m, and 8 kA/m are applied in the cross-track direction, respectively, found by numerical analysis, are shown by solid lines. The center position of the return pole, in the widthwise direction thereof, is designated as 0 along the horizontal axis. Similarly to the case shown in FIG. 6, results of numerical analysis made on the return pole in the conventional shape without the pole expanded parts 12 are also shown by dotted lines. With the present embodiment, the peak of an erase field (hereinafter referred to as an erase field A), produced at the end of the pole expanded part 12, occurs at a position of −60 μm, and the peak of an erase field (hereinafter referred to as an erase field B), produced in the vicinity of a junction between the return pole in the conventional shape, and the pole expanded part 12, occurs at a position of −30 μm (at a position of −25 μm in FIG. 8). Because a part of the pole, at a position of −60 μm, is in a saturation state, the erase field A becomes constant at 150 kA/m under the tolerable strength even if the external magnetic field increases in strength. There exist saturation parts mixed with non-saturation parts around the junction at a position of −30 μm, so that the erase field B undergoes changes depending on the magnitude of the external magnetic field to thereby reach 200 kA/m, the tolerable upper limit value for the erase field, in the case of the external magnetic field being at 8 kA/m. However, in comparison with the case of the return pole in the conventional shape, where in the case of the external magnetic field being at 2 kA/m, an erase field at 200 kA/m, the tolerable upper limit value for the erase field, is produced at the respective ends of the return pole, it is found that with the shape of the return pole according to the invention, resistance to the external magnetic field has been improved by about four times, so that the effect of the invention can be validated.

As can be seen in FIGS. 6 and 8, with the shape of the return pole according to the invention, excessive convergence of magnetic fluxes is avoided so as to be dispersed by forming saturation regions, so that the erase field is distributed in a wide range; however, it can be validated that the effect of the invention is significant in reduction in erase field strength. Since information deterioration at the maximum occurs at a position where erase field strength at the maximum occurs, thereby causing a problem of deterioration in reliability, it is important to reduce erase field strength at a position where the maximum erase field is produced.

More detailed reviews on the shape of the pole expanded part 12 are shown with reference to FIGS. 9, 10, and 19 to 27.

Figure 9:
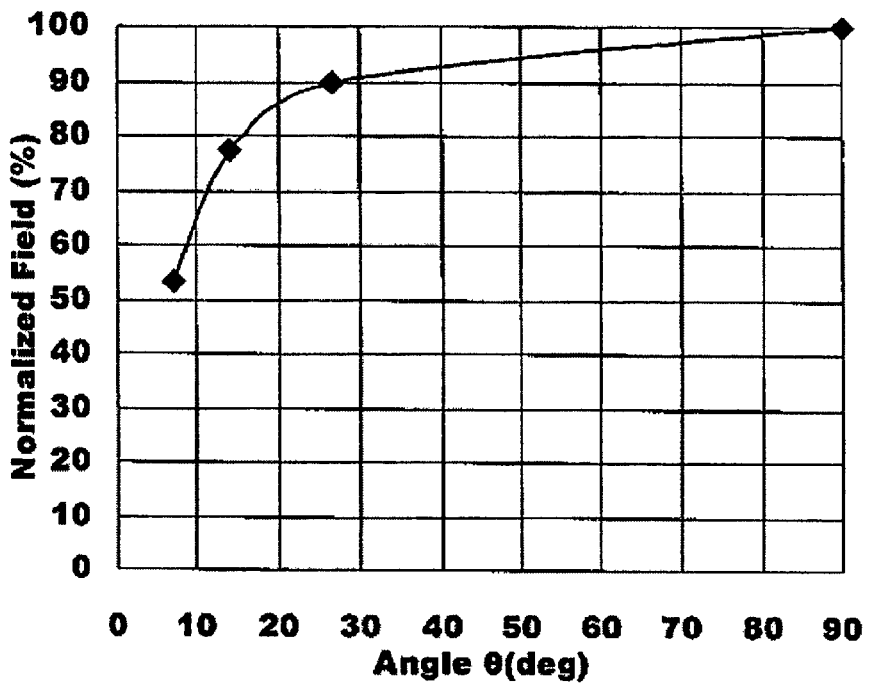
FIG. 9 is a view showing a relationship between an angle θ, and an erase field due to the external magnetic field in the perpendicular direction.
Figure 10:
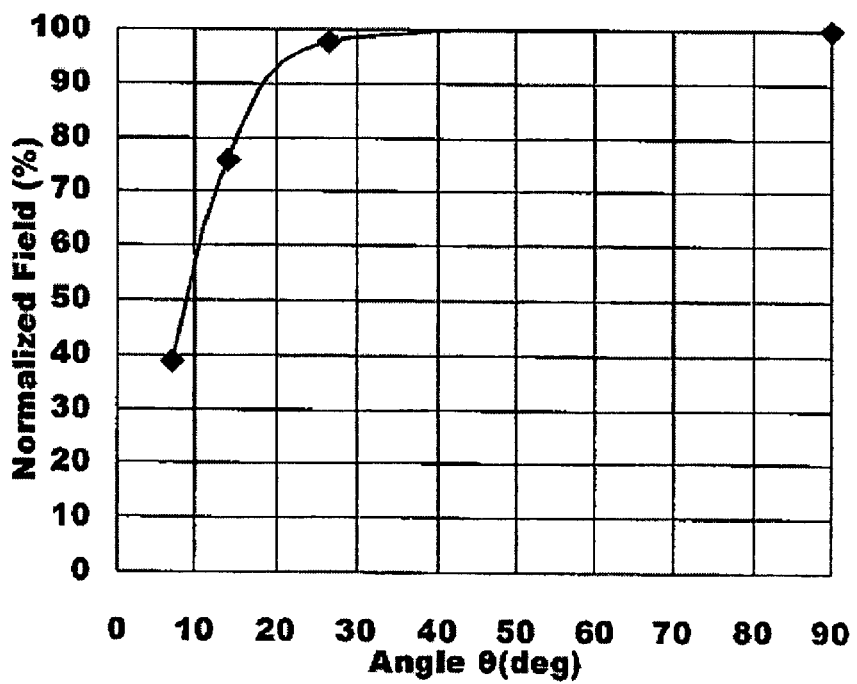
FIG. 10 is a view showing a relationship between the angle θ, and an erase field due to the external magnetic field in the cross-track direction.

FIGS. 9, and 10 are views showing a relationship between the angle θ shown in FIG. 13, and strength of the erase field A, in which the external magnetic field is in the perpendicular direction (FIG. 9) and in the cross-track direction (FIG. 10), respectively. Further, in the figures, the strength of the erase field A is shown by standardizing the erase field strength of the conventional shape without the pole expanded parts 12 shown in FIG. 13 as at 100%. It is evident from FIGS. 9, and 10 that the effect of reduction in the erase field A is exhibited pronouncedly in regions where the shape-defining angle θ is 30 degrees or less.

Figure 19:
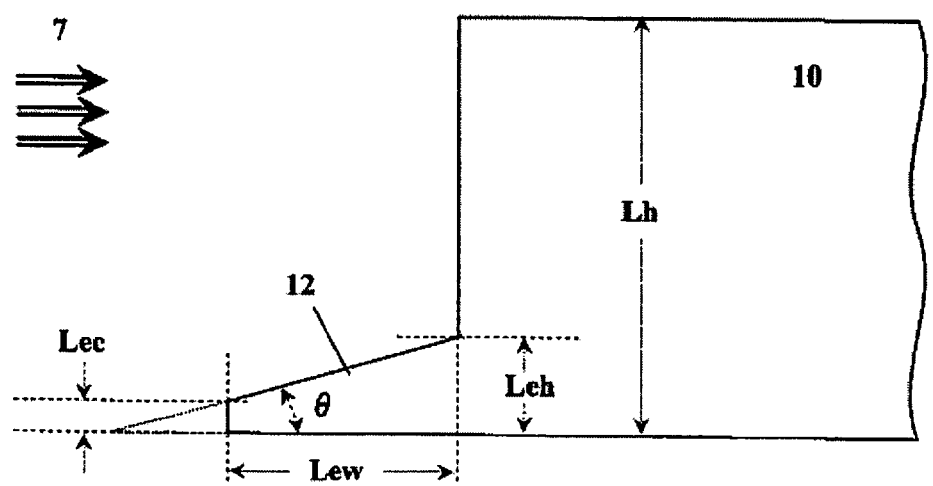
FIG. 19 is a view showing a detailed shape of a pole expanded part.

FIG. 19 is a plan view of the return pole 10, as seen from the traveling direction of the head. In this case, as the shape parameters for describing the shape of the return pole, use is made of a width Lew of the pole expanded part, a height Leh of the pole expanded part, at the root thereof, a height Lec of the pole expanded part, at the end thereof, and a height Lh of the return pole 10, besides the angle θ. As shown in FIG. 19, if Lec=0 μm, the pole expanded part will be in the same shape as that shown in FIG. 13, however, if Lec>0 μm, the pole expanded part 12 will be in the shape of a trapezoid instead of the wedge-like shape. The angle θ is a taper angle formed between the upper side of the pole expanded part 12, and the air bearing surface.

Figure 20:
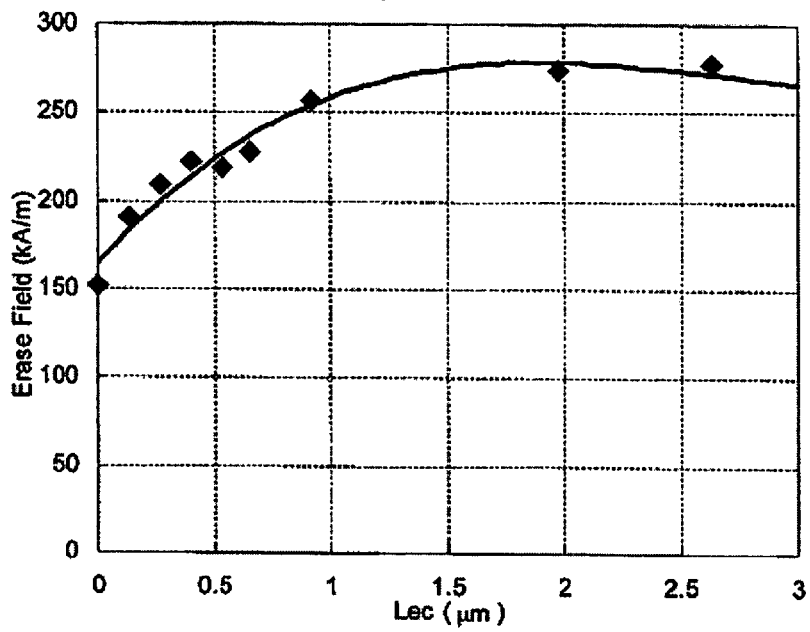
FIG. 20 is a diagram showing a relationship between the height of the pole expanded part and the erase field.

FIG. 20 is a view showing the erase field A's dependency on the height Lec of the pole expanded part 12, at the end thereof, and is a view showing results of numerical analysis made on an embodiment in the tapered shape, provided with pole expanded parts 12 each in a trapezoidal shape, 8 μm in height Leh, and 2 μm in thickness, added to a return pole in the conventional shape of the rectangular flat sheet, 60 μm in width Lw, 30 μm in height Lh, and 2 μm in thickness, so as to render the angle θ equal to 15 degrees when the external magnetic field at 4 kA/m is applied in the cross-track direction. The width Lew of the pole expanded part 12 was varied so as to correspond to the height Lec as follows:

$$Lew(\mu m)=30-Lec(\mu m)/\tan(15°)$$

Assuming the use of the soft magnetic material $Ni_{80}Fe_{20}$ generally in widespread use as the head material, the magnetic pole was assumed to have magnetic property of saturation magnetic flux density Bs=1T, and initial permeability $\mu_0$=1000.

Since the strength of the erase field in the case of the conventional shape without the pole expanded parts 12 is on the order of 260 kA/m as shown in FIG. 8, it is evident from FIG. 20 that the invention has the effect of improvement over the conventional shape if Lec is 1 μm or less. If Lec exceeds 1 μm, convergence of magnetic fluxes becomes greater due to an increase in total width of the return pole to the extent of an addition made to the pole expanded part 12, so that there occurs an increase in the erase field more than for the case of the conventional shape. Assuming that a tolerable erase field is at 200 kA/m when the external magnetic field at 4 kA/m is applied. Lec need be 0.2 μm or less, which is regarded within an achievable range even if variation, and so forth, occurring to the head upon actual fabrication thereof is taken into account.

Figure 21:
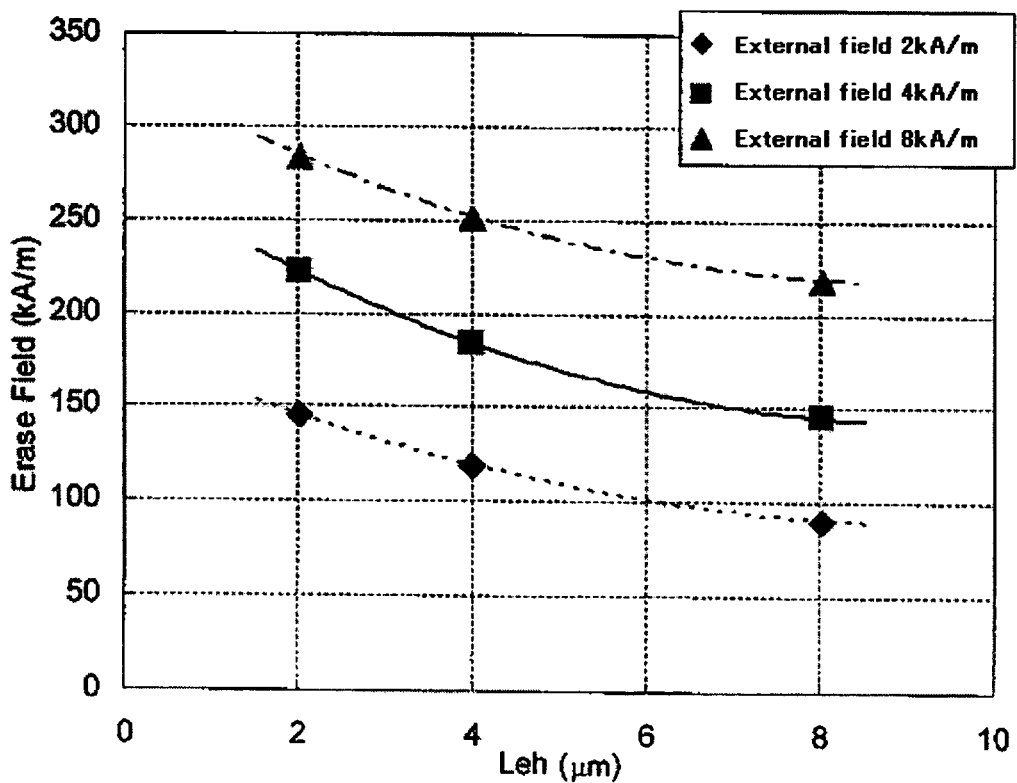
FIG. 21 is a diagram showing a relationship among the height of the pole expanded part, the external magnetic fields applied, and the erase field.

FIG. 21 is a view showing a relationship between the strength of the erase field B produced at the junction between the return pole in the conventional shape, and the pole expanded part 12, shown in FIG. 8, and the height Leh of the pole expanded part 12. Numerical analysis was performed on the return pole in the tapered shape, provided with the pole expanded parts 12 each in the wedge-like shape, 30 μm in width Lew, 8 μm in height Leh, and 0 μm in height at the end thereof, added to the return pole in the conventional shape of the rectangular flat sheet, 60 μm in width Lw, 30 μm in height Lh, and 2 μm in thickness, so as to render the angle θ equal to 15 degrees when the external magnetic fields at 2 kA/m, 4 kA/m, and 8 kA/m are applied, respectively. The width Lew of the pole expanded part 12 was varied so as to correspond to the height Leh as follows:

$$Lew(\mu m)=Leh(\mu m)/\tan(15°)$$

Further, assuming the use of the soft magnetic material $Ni_{80}Fe_{20}$ generally in widespread use as the head material, the magnetic pole was assumed to have magnetic property of saturation magnetic flux density Bs=1T, and initial permeability $\mu_0$=1000.

Figure 22:
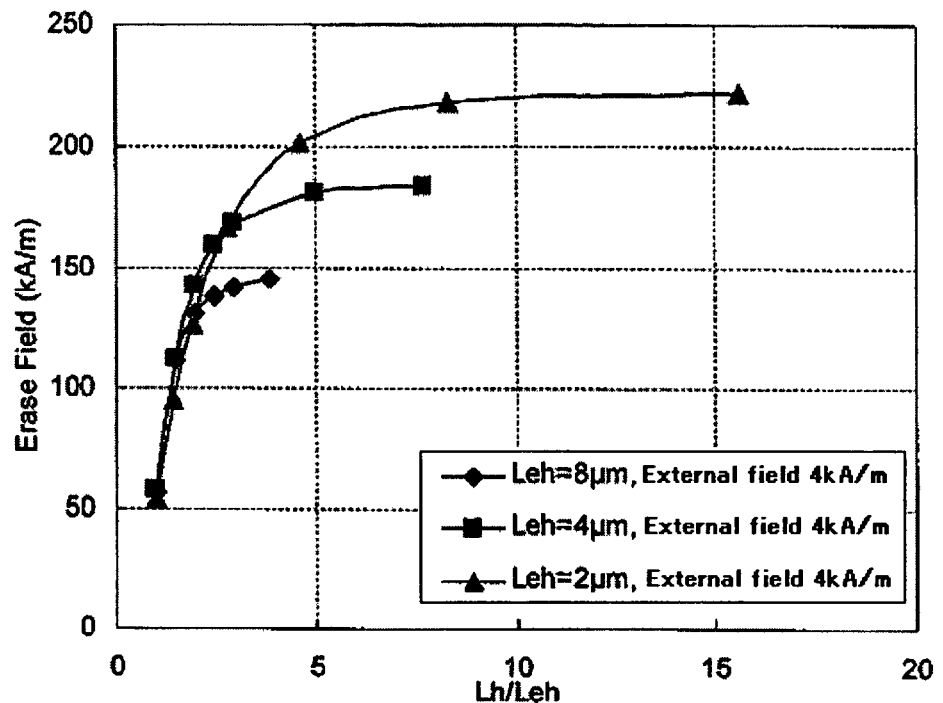
FIG. 22 is a diagram showing a relationship between the external magnetic fields applied, and the erase field, in relation to a ratio of the height of the return pole to the height of the pole expanded part.
Figure 23:
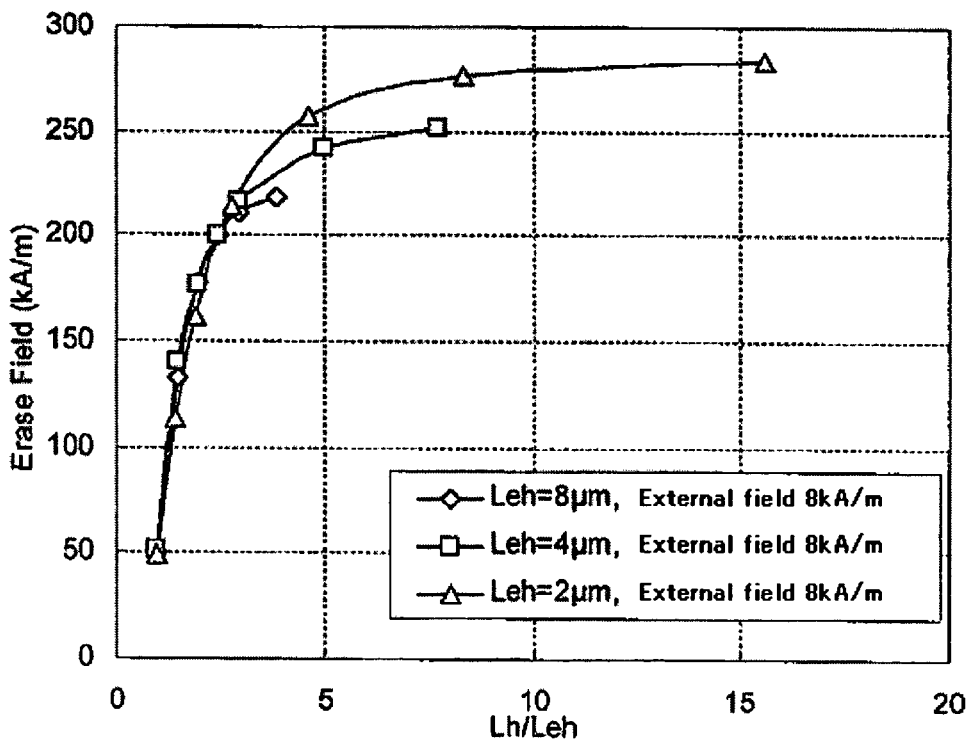
FIG. 23 is another diagram showing a relationship between the external magnetic fields applied, and the erase field, in relation to a ratio of the height of the return pole to the height of the pole expanded part.

It is evident from FIG. 21 that the larger Leh and Lew are, the more the erase field B is produced at the junction between the return pole in the conventional shape, and the pole expanded part 12 can be reduced. FIGS. 22 and 23 show results of detailed reviews of the above, that is, results of analysis on the same shape as is shown in FIG. 21, to be varied into three shapes such that Leh is 2 μm, 4 μm, and 8 μm, respectively, while the height Lh of the return pole in the conventional shape is varied when the external magnetic fields at 2 kA/m, 4 kA/m, and 8 kA/m are applied in the cross-track direction, respectively, thereby showing a relationship between a ratio of Lh to Leh, and the strength of the erase field B. It is evident from FIGS. 22 and 23 that the strength of the erase field B is highly dependent on the ratio of Lh to Leh, indicating that the erase field B can be significantly reduced in a region where Lh becomes not more than five times as large as Leh. Further, assuming that the tolerable erase field is at 200 kA/m, it need only be sufficient that Lh/Leh is 4.8 or less, and 2.4 or less against the external magnetic field at 4 kA/m, and 8 kA/m, respectively.

Figure 24:
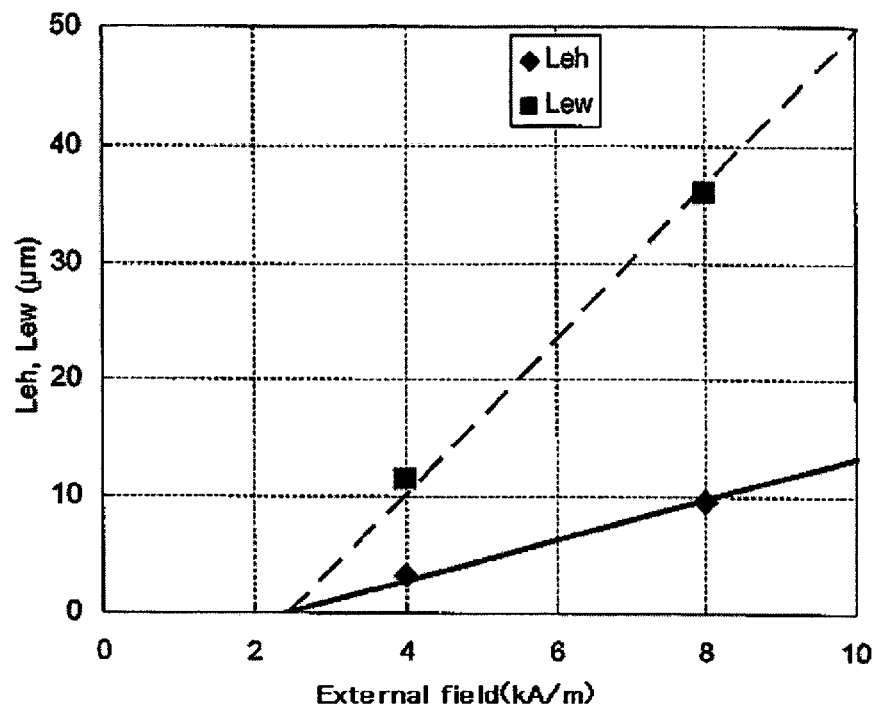
FIG. 24 is a diagram showing a relationship between dimensions of the shape of the pole expanded part, for the tolerable erase field.

FIG. 24 is a view showing respective sizes of Leh, and Lew, at which the strength of the erase field B becomes 200 kA/m when the external magnetic field 7 in the cross-track direction is applied to the return pole in the tapered shape, provided with the pole expanded parts 12 each in the wedge-like shape, Lew in width, Leh in height, and 0 μm in height at the end thereof, added to the return pole in the conventional shape of the rectangular flat sheet, 60 μm in width Lw, 30 μm in height Lh, and 2 μm in thickness, so as to render the taper angle θ equal to 15 degrees. With the conventional shape of the return pole, in order that the strength of the erase field B becomes 200 kA/m or less at strength Hext (kA/m) of the external magnetic field on the basis of respective approximate straight lines, the following relationships need be concurrently satisfied:

$$Leh \geqq 1.76 \times Hext - 4.25$$

$$Lew \geqq 6.6 \times Hext - 16.25.$$

In the above formula, the height Leh, and the width Lew are expressed in units of μm. Further, in this case, even if θ is other than 15 degrees, Lew is defined by Leh and θ, so that $Lew \geqq Leh/\tan\theta$.

Figure 25:
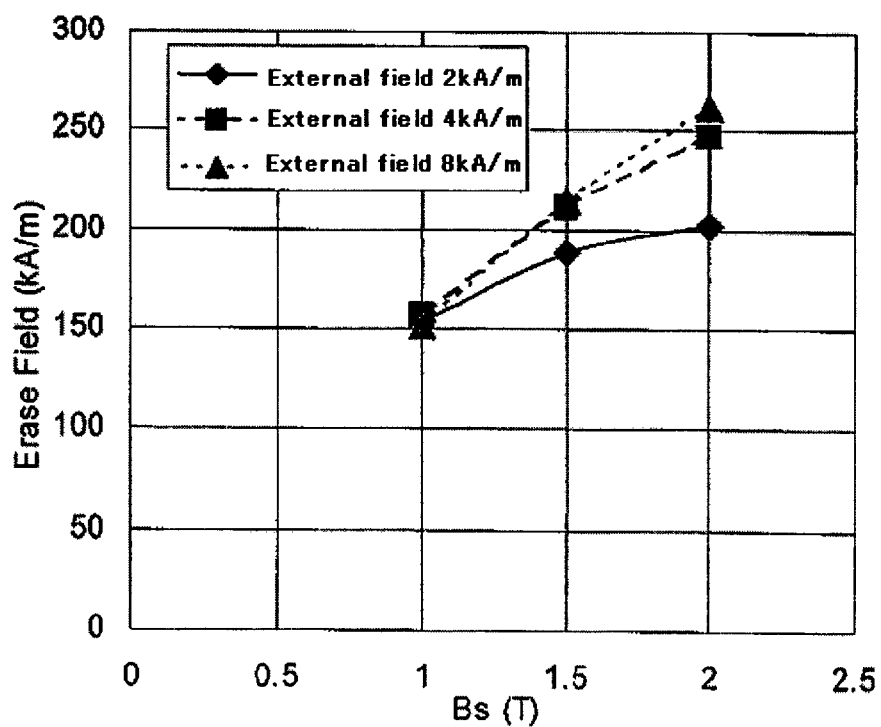
FIG. 25 is a diagram showing a relationship between a magnetic material with Bs, and an erase field A.
Figure 26:
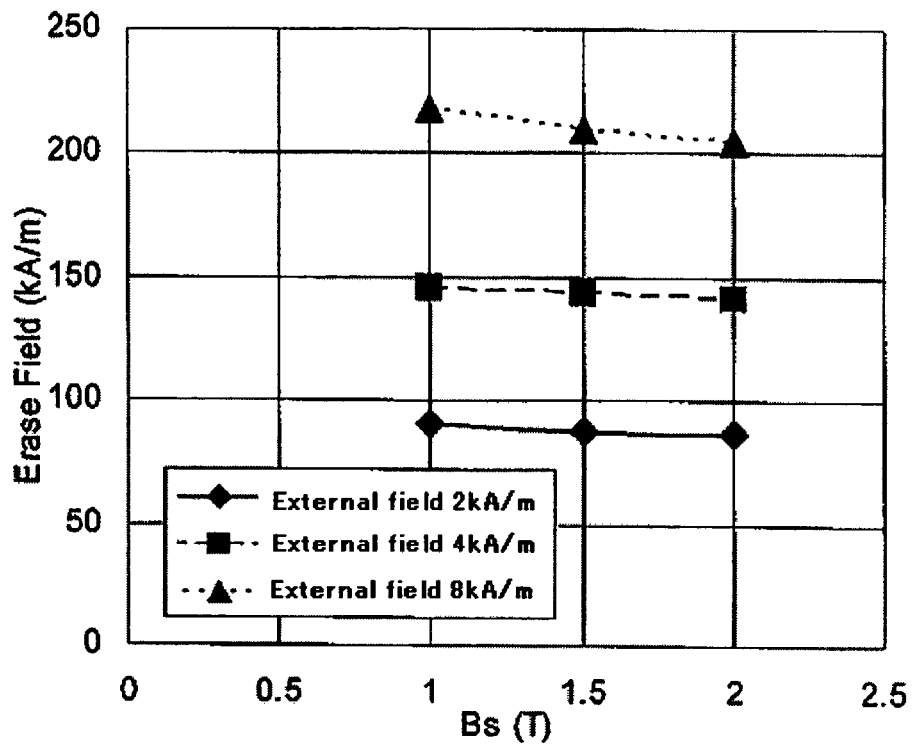
FIG. 26 is a diagram showing a relationship between the magnetic material with Bs, and an erase field B.

In verifications made in the foregoing, it has been assumed that the head material is the soft magnetic material $Ni_{80}Fe_{20}$, Bs=1T, and μ0=1000; however, the effect of the invention can be validated with the return pole 10 using a soft magnetic material with Bs, and $\mu_0$, differing in value from the above. FIGS. 25 and 26 are views showing variation in the erase field A (FIG. 25), and the erase field B (FIG. 26), respectively, when the head material was varied in Bs in the case where the external magnetic fields at 2 kA/m, 4 kA/m, and 8 kA/m are applied in the cross-track direction, respectively. As with the case of the embodiment described previously, the return pole is the tapered shape, provided with the pole expanded parts 12 each in the wedge-like shape, 30 μm in width Lew, 8 μm in height Leh, and 2 μm in thickness, added to the return pole in the conventional shape of the rectangular flat sheet, 60 μm in width Lw, 30 μm in height Lh, and 2 μm in thickness, so as to render the angle θ equal to 15 degrees.

Figure 27:
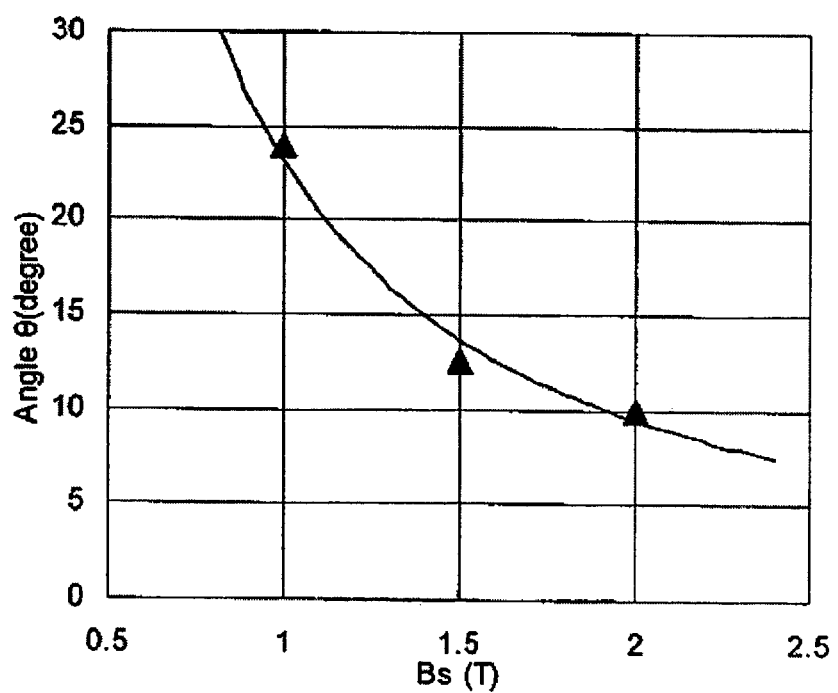
FIG. 27 is a diagram showing a relationship between the magnetic material with Bs, and a taper angle.

With Bs at 1.5T and 2.0T in FIG. 25, saturation does not occur to the end of the pole expanded part 12 when the strength of the external magnetic field 7 is as small as 2 kA/m, so that a tendency differs from other cases; however, when the external magnetic field 7 is at 4 and 8 kA/m, respectively, it can be validated that the erase field A produced is determined by Bs of the head material, and is substantially proportional to Bs because saturation occurs even to the end of the pole expanded part 12. In contrast, it can be validated that the erase field B is hardly dependent on Bs, as shown in FIG. 26. Since a proportional increase in the erase field A due to Bs applies to the return pole in the conventional shape, any of relationships of θ≦30 deg., Lec≦1.0 μm, and Lh/Leh≦5, representing previously described improvement obtained in comparison with the conventional shape holds. FIG. 27 is a view showing magnitude of the angle θ at which the erase field A is at 200 kA/m when the external magnetic field 7 at 4 kA/m is applied. Accordingly, based on an approximate curve in FIG.

27, it can be said that with the present embodiment, to meet requirements for the erase field A to be at 200 kA/m, it is necessary to satisfy a relationship of $\theta \leq 23.1 \times (Bs)^{-1.29}$.

Figure 14:
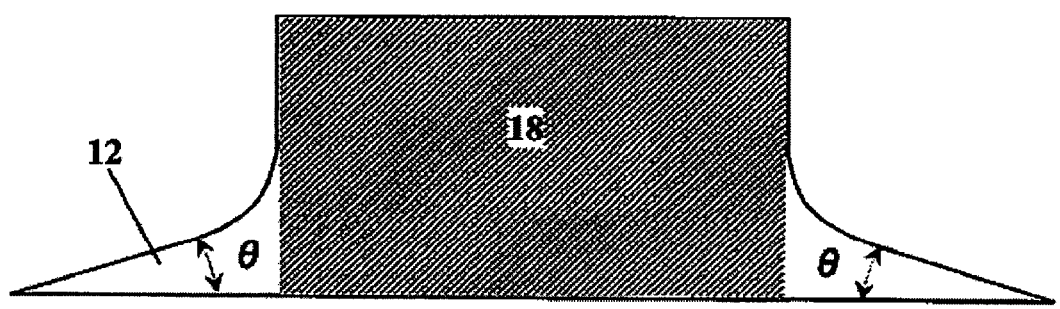
FIG. 14 is a block diagram showing a construction of another return pole according to the invention by way of example.
Figure 15:
FIG. 15 is a block diagram showing a construction of still another return pole according to the invention by way of example.
Figure 16:
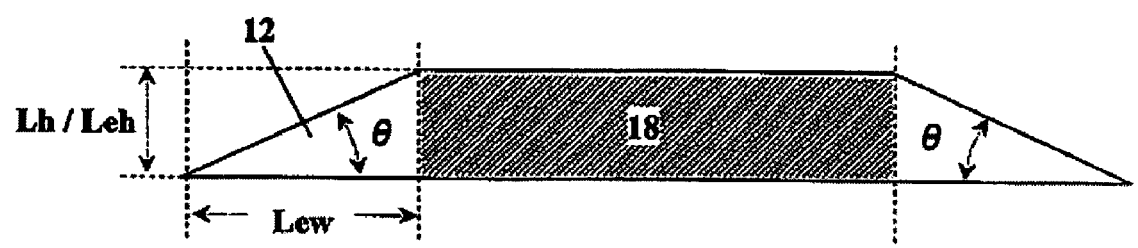
FIG. 16 is a block diagram showing a construction of a further return pole according to the invention by way of example.

Further, the shape of the pole expanded part 12 is not limited to the shape shown in FIG. 13, and it is regarded that by connecting the pole expanded parts 12 in a smoothly curved form to the return pole of the conventional shape, as shown in FIG. 14, the erase field B produced at the boundary between the pole expanded part, and the conventional return pole, as seen at the position −30 μm in FIG. 8, can be adjusted. Further, even if the return pole proper is formed in the shape of a triangle or a trapezoid such as is obtained by extending the pole expanded parts 12, as shown in FIGS. 15, and 16, the effect of the invention can be obtained provided that the angle θ for defining the pole tapered shape, at the respective ends thereof, is about 30 degrees or less. Further, with the shapes shown in FIGS. 15, and 16, respectively, discontinuity in saturation, at the junctions between the pole expanded parts, and the conventional return pole, as observed in FIG. 8, disappears, and continuity in saturation results, so that those shapes are regarded as the most efficient shapes of the return pole, in which the erase field B is not produced.

Figure 18:
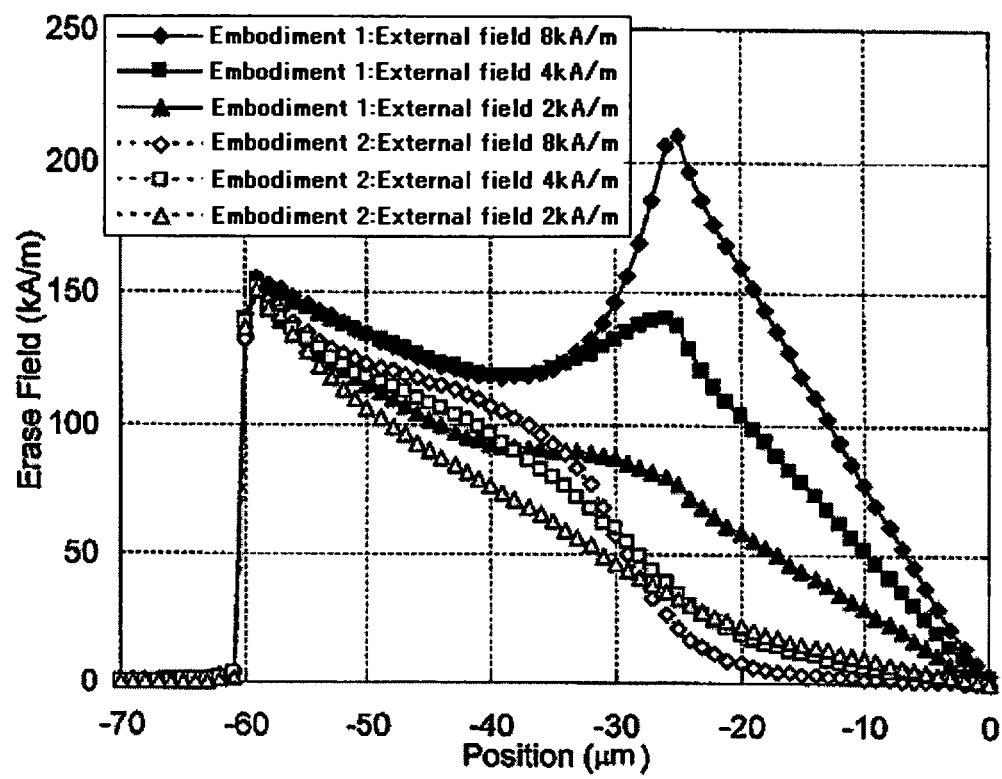
FIG. 18 is another view showing distributions of erase fields occurring due to the external magnetic field in the cross-track direction.

In FIG. 18, distributions of erase fields, when the external magnetic fields 7 in the cross-track direction are applied, respectively, to the shape shown in FIG. 16, are shown by dotted lines as Embodiment 2. The distributions of the erase fields for the embodiment, shown in FIG. 8, also are shown by solid lines as Embodiment 1. The shape used for calculation, as shown in FIG. 16, is a shape provided with the pole expanded parts 12, each 30 μm in width Lew, 8 μm in height Leh, and 2 μm in thickness, added to the conventional return pole in the rectangular shape, 60 μm in width Lw, 8 μm in height Lh, and 2 μm in thickness, so as to render the angle θ equal to 15 degrees, and the head material has Bs=1T, and $\mu_0$=1000. It is evident from FIG. 18 that the erase field B, as observed in the vicinity of the position at −30 μm in the case of Embodiment 1, has not been produced after improvement.

Thus, the erase field B, due to discontinuity in saturation, is produced because the conventional return pole is not yet saturated while the pole expanded parts 12 that are about to undergo magnetic saturation, due to the difference in cross-sectional area between both faces thereof, normal to the cross-track direction, so that in order to prevent occurrence of the erase field B, it need only be sufficient to render the cross-sectional area of the conventional return pole, at the junction thereof, smaller than that of each of the pole expanded parts 12. Accordingly, to form a shape without discontinuity in magnetic saturation, at the conventional return pole, and the pole expanded parts, that is, such the shape as shown in FIG. 16, if the height of the conventional return pole is Lh, and the width of the pole expanded parts 12 is Lew, a relationship with the angle θ need be within a range expressed as follows:

$$Leh = Lew \times \tan\theta \geq Lh$$

Figure 17:
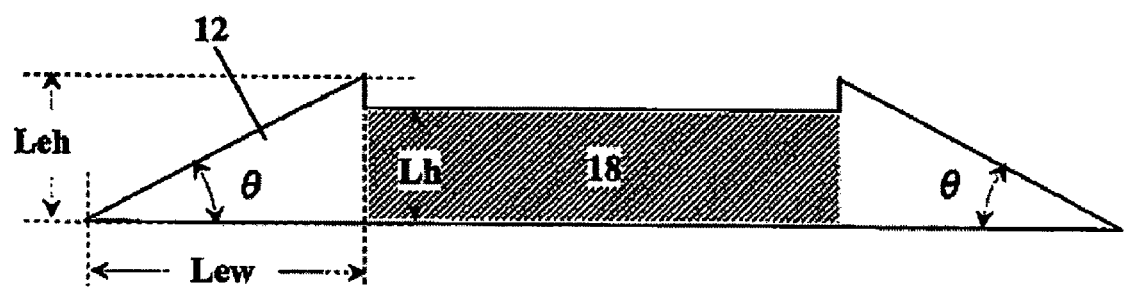
FIG. 17 is a block diagram showing a construction of a still further return pole according to the invention by way of example.

Based on the above, with a shape shown in FIG. 17, an improvement effect concerning the erase field B can be similarly expected.

Figure 11:
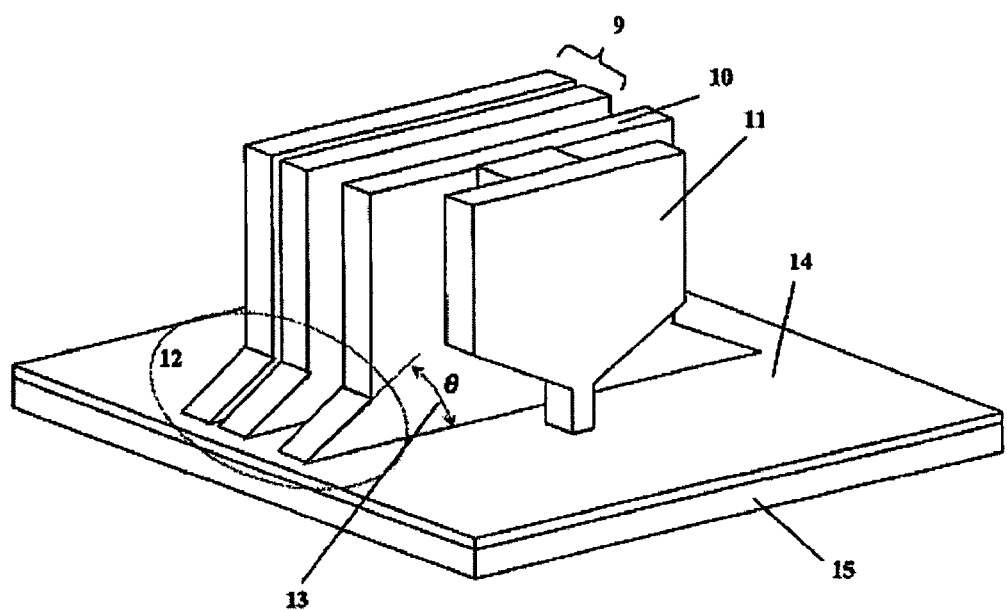
FIG. 11 is an enlarged block diagram showing a construction of an SPT head according to another embodiment of the invention.
Figure 12:
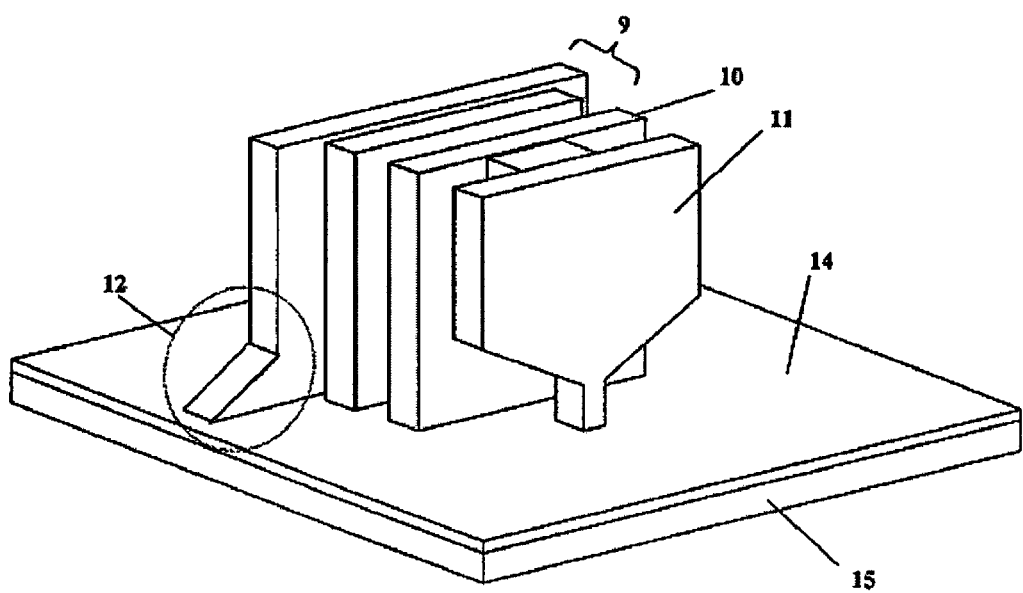
FIG. 12 is an enlarged block diagram showing a construction of an SPT head according to another embodiment of the invention.
Figure 28:
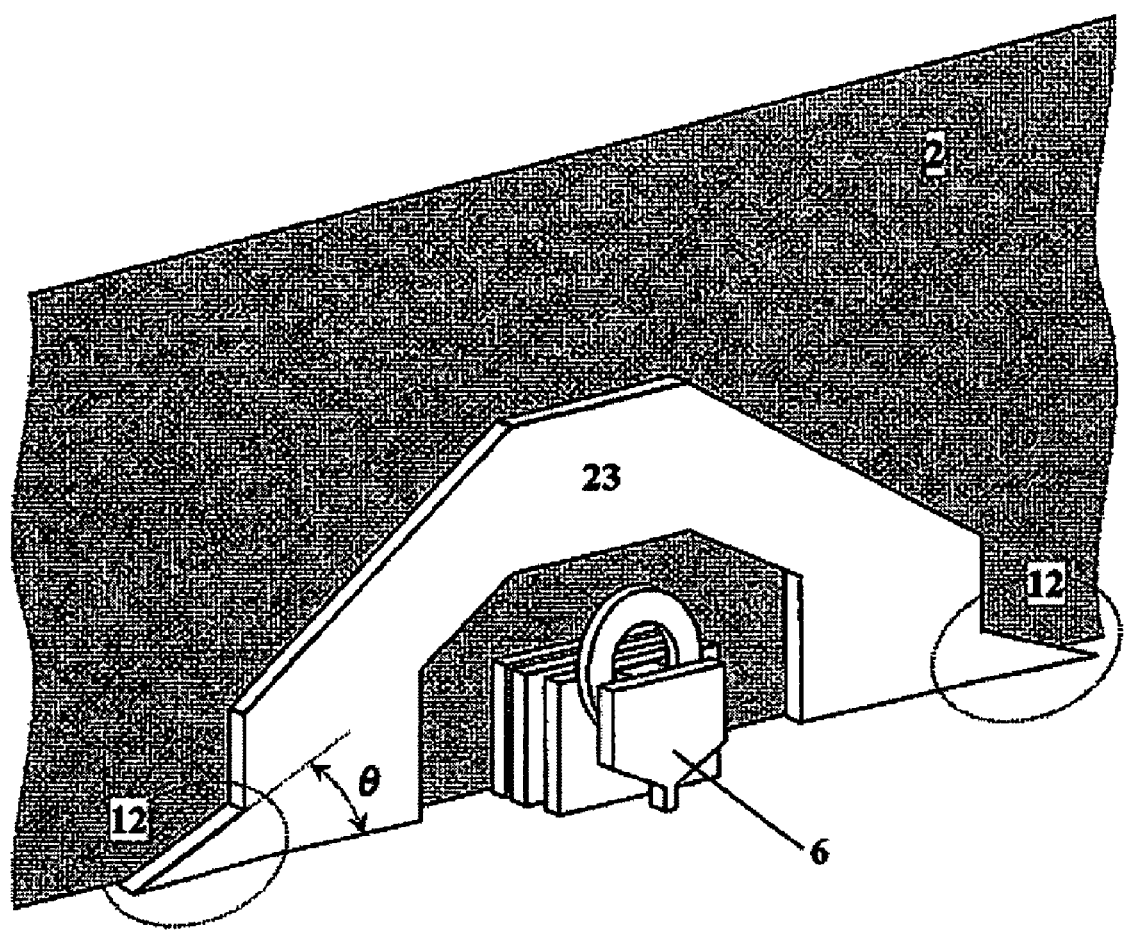
FIG. 28 is a schematic view broadly showing an example of applying the invention to a soft magnetic shield.

Further, application of the pole expanded part 12 is not limited to the return pole 10, and needless to say, the pole expanded parts 12 can be concurrently applied to both the return pole 10 and the soft magnetic shields 9, as shown in FIG. 11, or to only one of the soft magnetic shields 9, as shown in FIG. 12, thereby obtaining the effect of reduction in the erase field. Furthermore, as previously described, the greater a shape in the cross-track direction, the more the convergence of magnetic fluxes is prone to occur, so that the application of the pole expanded parts 12 to only a portion of the magnetic pole, having the largest shape in the cross-track direction, as shown in FIG. 12, is effective from the viewpoint of minimizing increase in the steps of a manufacturing process. Further, the application of the tapered shape is not limited to the pole part of a magnetic head, and the same effect can be obtained even if the pole tapered shape according to the invention is applied to the respective ends of a soft magnetic shield 23 disposed so as to cover a head 6 formed on a slider 2, as shown in FIG. 28, as a countermeasure against the external magnetic field.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head comprising:
   a read head having a magneto-resistive element sandwiched between a first soft magnetic shield, and a second soft magnetic shield; and
   a perpendicular magnetic write head having a return pole and a main pole,
   wherein at least one of the return pole, the first soft magnetic shield, and the second soft magnetic shield has a tapered shape with a cross-sectional area thereof, normal to a cross-track direction, decreasing from a center of the head outwardly in the cross-track direction; and
   wherein an angle θ formed between an air bearing surface, and an upper side of at least one of the return pole, the first soft magnetic shield, and the second soft magnetic shield, at the end thereof, in the cross-track direction, or an extended line of the upper side is about 30 degrees or less.

2. A magnetic head according to claim 1, wherein at least one of the return pole, the first soft magnetic shield, and the second soft magnetic shield has a tapered shape with a cross-sectional area thereof, normal to the direction of an element height, decreasing upward from an air bearing surface in the direction of the element height.

3. A magnetic recording system according to claim 1, wherein at least one of the return pole, the first soft magnetic shield, and the second soft magnetic shield has a tapered shape in each of both ends in the cross-track direction.

4. A magnetic recording system according to claim 1, wherein the tapered shapes in both ends are identical.

5. A magnetic head comprising:
   a read head having a magneto-resistive element sandwiched between a first soft magnetic shield, and a second soft magnetic shield; and
   a perpendicular magnetic write head having a return pole and a main pole,
   wherein at least one of the return pole, the first soft magnetic shield, and the second soft magnetic shield has a tapered shape with a cross-sectional area thereof, normal to a cross-track direction, decreasing from a center of the head outwardly in the cross-track direction; and
   wherein at least one of the return pole, the first soft magnetic shield, and the second soft magnetic shield has a center part in the shape of a rectangle, to each of both ends, in the cross-track direction, of which an addition part substantially triangular or trapezoidal in shape, is connected, an angle formed between an upper side of the addition part, in the direction of an element height, or an extended line of the upper side, and an air bearing surface being θ, and the following relationship being satisfied:

$\theta \leq 30 (\text{deg.})$ $Lec \leq 1.0 (\mu m)$ $Lh/Lec \leq 5$ where a height of the center part, at a junction between the center part, and the addition part, in the direction of the element height, is Lh (μm); a height of the addition part, at the junction, in the direction of the element height, is Leh (μm); and a height of the addition part, at the end thereof, on a side thereof, opposite from the junction, is Lec (μm).

6. A magnetic head according to claim 5, wherein the following relationship is satisfied:

$Lh/Lec \leq 1$.

7. A magnetic recording system comprising:
a magnetic head having a read head having a magneto-resistive element sandwiched between a first soft magnetic shield, and a second soft magnetic shield, and a perpendicular magnetic write head having a return pole and a main pole;
a substrate;
a perpendicular magnetic recording layer formed over the substrate; and
a perpendicular magnetic recording medium having a soft magnetic layer formed between the substrate and the perpendicular magnetic recording layer,
wherein at least one of the return pole, the first soft magnetic shield, and the second soft magnetic shield has a tapered shape with a cross-sectional area thereof, normal to a cross-track direction, decreasing from a center of the head outwardly in the cross-track direction; and
wherein an angle θ formed between an air bearing surface, and the upper side of at least one of the return pole, the first soft magnetic shield, and the second soft magnetic shield, at the end thereof, in the cross-track direction, or an extended line of the upper side is about 30 degrees or less.

8. A magnetic recording system according to claim 7, wherein at least one of the return pole, the first soft magnetic shield, and the second soft magnetic shield has a tapered shape with a cross-sectional area thereof, normal to the direction of an element height, decreasing upward from an air bearing surface in the direction of the element height.

9. A magnetic recording system according to claim 7, wherein at least one of the return pole, the first soft magnetic shield, and the second soft magnetic shield has a tapered shape in each of both ends in the cross-track direction.

10. A magnetic recording system according to claim 9, wherein the tapered shapes in both ends are identical.

11. A magnetic recording system comprising:
a magnetic head having a read head having a magneto-resistive element sandwiched between a first soft magnetic shield, and a second soft magnetic shield, and a perpendicular magnetic write head having a return pole and a main pole;
a substrate;
a perpendicular magnetic recording layer formed over the substrate; and
a perpendicular magnetic recording medium having a soft magnetic layer formed between the substrate and the perpendicular magnetic recording layer, wherein at least one of the return pole, the first soft magnetic shield, and the second soft magnetic shield has a tapered shape with a cross-sectional area thereof, normal to a cross-track direction, decreasing from a center of the head outwardly in the cross-track direction; and
wherein at least one of the return pole, the first soft magnetic shield, and the second soft magnetic shield has a center part in the shape of a rectangle, to each of both ends, in the cross-track direction, of which an addition part substantially triangular or trapezoidal in shape, is connected, an angle formed between an upper side of the addition part, in the direction of an element height, or an extended line of the upper side, and an air bearing surface being θ, and the following relationship being satisfied:

$\theta \leq 30 (\text{deg.})$ $Lec \leq 1.0 (\mu m)$ $Lh/Lec \leq 5$ where a height of the center part, at a junction between the center part, and the addition part, in the direction of the element height, is Lh (μm); a height of the addition part, at the junction, in the direction of the element height, is Leh (μm); and a height of the addition part, at the end thereof, on a side thereof, opposite from the junction, is Lec (μm).

12. A magnetic recording system according to claim 11 wherein the following relationship is satisfied:

$Lh/Lec \leq 1$.

13. A magnetic head comprising:
a read head having a magneto-resistive element sandwiched between a first soft magnetic shield, and a second soft magnetic shield; and
a perpendicular magnetic write head having a return pole and a main pole,
wherein at least one of the return pole, the first soft magnetic shield, and the second soft magnetic shield has a tapered shape with a cross-sectional area thereof, normal to a cross-track direction, decreasing from a center of the head outwardly in the cross-track direction;
wherein at least one of the return pole, the first soft magnetic shield, and the second soft magnetic shield has a center part, to each of both ends, in the cross-track direction, of which an addition part substantially triangular or trapezoidal in shape, is connected; and
wherein an angle θ formed between an air bearing surface, and an upper side of at least one of the return pole, the first soft magnetic shield, and the second soft magnetic shield, at the end thereof, in the cross-track direction, or an extended line of the upper side is about 30 degrees or less.

14. A magnetic head according to claim 13, wherein at least one of the return pole, the first soft magnetic shield, and the second soft magnetic shield has a tapered shape with a cross-sectional area thereof, normal to the direction of an element height, decreasing upward from an air bearing surface in the direction of the element height.

15. A magnetic recording system according to claim 13, wherein the connected additional parts are shaped as mirror images of each other.

16. A magnetic head comprising:
a read head having a magneto-resistive element sandwiched between a first soft magnetic shield, and a second soft magnetic shield; and a perpendicular magnetic write head having a return pole and a main pole, wherein at least one of the return pole, the first soft magnetic shield, and the second soft magnetic shield has a tapered shape with a cross-sectional area thereof, normal to a cross-track direction, decreasing from a center of the head outwardly in the cross-track direction;

wherein at least one of the return pole, the first soft magnetic shield, and the second soft magnetic shield has a center part, to each of both ends, in the cross-track direction, of which an addition part substantially triangular or trapezoidal in shape, is connected; and wherein at least one of the return pole, the first soft magnetic shield, and the second soft magnetic shield has a center part in the shape of a rectangle, to each of both ends, in the cross-track direction, of which an addition part substantially triangular or trapezoidal in shape, is connected, an angle formed between an upper side of the addition part, in the direction of an element height, or an extended line of the upper side, and an air bearing surface being $\theta$, and the following relationship being satisfied:

$$\theta \leq 30 (\text{deg.})$$

$$Lec \leq 1.0 (\mu m)$$

$$Lh/Lec \leq 5$$

where a height of the center part, at a junction between the center part, and the addition part, in the direction of the element height, is Lh ($\mu$m); a height of the addition part, at the junction, in the direction of the element height, is Leh ($\mu$m); and a height of the addition part, at the end thereof, on a side thereof, opposite from the junction, is Lec ($\mu$m).

17. A magnetic head according to claim 16, wherein the following relationship is satisfied:

$$Lh/Lec \leq 1.$$

* * * * *